March 21, 1961 J. V. STROBURG ET AL 2,975,700
PRESS ROLL TWINE GUARD FOR ROLL-TYPE BALERS
Filed Jan. 24, 1958
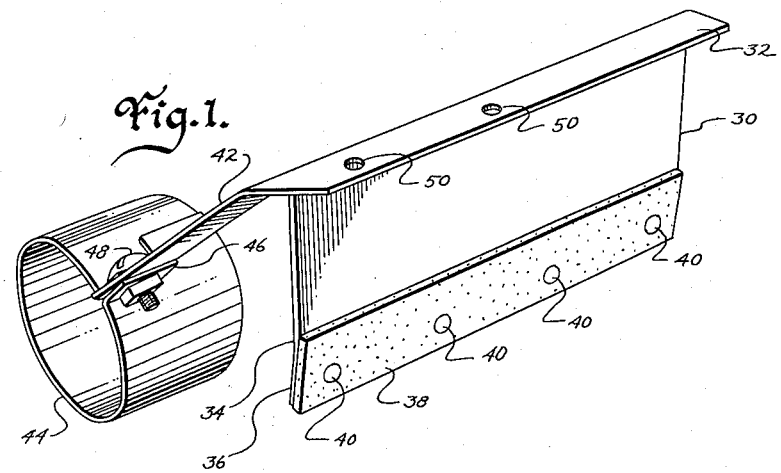
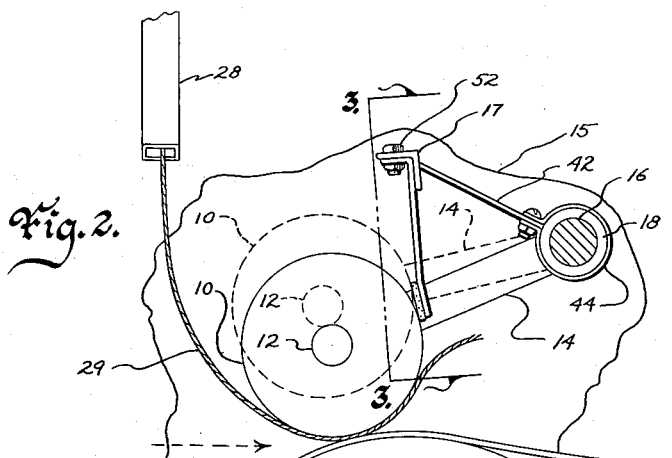
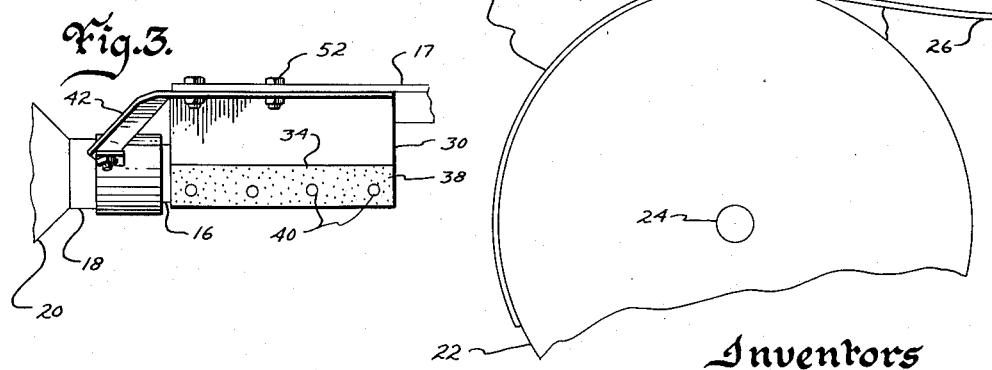
Inventors
John V. Stroburg &
Glen O. Stroburg
by Donald H. Zarley
Attorney
Witness
Edward P. Seeley United States Patent Office 2,975,700
Patented Mar. 21, 1961

2,975,700

PRESS ROLL TWINE GUARD FOR ROLL-TYPE BALERS

John V. Stroburg and Glen O. Stroburg, both of Blockton, Iowa

Filed Jan. 24, 1958, Ser. No. 710,937

2 Claims. (Cl. 100—5)

Our invention relates to hay baling machines which use twine to bind the bale and, more particularly, to a device to control the twine as it is being fed into the machine.

In recent years, machines have been devised to package hay or straw in rolled circular bales rather than the conventional folded, rectangular bale. The rolled bale has many advances over the rectangular bale in that the rolled bale is better able to save the leaves, and thus the food value, of the hay. This is because the rolled bale does not require a great amount of crushing and breaking of the hay stems as the hay is picked up from the windrow. The rolled bale is easier to handle since it can be rolled instead of manually carried. The hay or straw itself holds the rolled bale together which permits binder twine to be used on the bale rather than the conventional baling wire.

The rolled bale is formed by picking the cut material up from the windrow and conveying the material through a series of rolls and belts. The cut material itself pulls the loose end of the twine into the rolls to effect the binding of the completed bale. The initial entry of the cut material into the machine is made underneath a resiliently mounted press roll which bears on a belt which in turn is mounted over a large circular drum or roll member. This structure is typical of the most predominant roll-type baling machine, the "Roto-Baler" built by the Allis-Chalmers Manufacturing Company of Milwaukee, Wisconsin. The loose end of the twine enters the machine through the same path as the cut material. Many times the twine fails to follow the cut material through the machine as intended, but winds itself around the press roll instead. As much a thirty lineal feet of twine are used to bind a single bale and if the twine is wound around the press roll, it must be cut from the roll and discarded. Besides taking time to cut the twine from the press roll, the operator must also take the time to run the unbound bale through the machine again to effect the binding thereof.

Therefore, the principal object of our invention is to provide a guard for the press roll of a roll-type baler that will prevent the twine from being wound about the press roll.

A further object of our invention is to provide a guard for the press roll of a roll-type baler that will prevent the twine from being wound about the press roll even though the position of the press roll with respect to the guard is varied.

A still further object of our invention is to provide a twine guard for the press roll of a roll-type baler that is economical of manufacture, durable in use and refined in appearance.

These and other objects of our invention will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

Fig. 1 is a perspective view of our device;

Fig. 2 is an end elevational view of our device mounted to the frame of a roll-type baler. The dotted lines in this figure indicate an alternate position of the press roll. Because they do not constitute a part of our invention, some of the elements of the roll-type baler have been shown in Fig. 2 only by fragmentary lines and they are present only to more clearly illustrate the operation of our device; and Fig. 3 is a rear elevational view of our device taken on line 3—3 of Fig. 2.

We have used the numeral 10 to designate an elongated press roll which is rigidly mounted in any conventional manner on press roll shaft 12. Shaft 12 is rotatably supported near each of its ends by a bearing arm 14 which in turn is capable of rotational movement about drive shaft 16. Drive shaft 16 is mounted on the frame of the baler machine 15 and is operatively connected to a source of rotational power. The numeral 18 designates the sleeve of a gear box 20 into which one end of shaft 16 extends. Drive shaft 16 is also gear-connected to shaft 12 but the details of this connection, as well as the power source, have not been shown since they do not comprise a part of our invention. A roll member which is generally mounted on shaft 16 has also been eliminated for the same reason. As shown in Fig. 2, a frame member 17 is mounted on the frame 15 above roll 10 and shaft 16 in parallel fashion therewith. Bearing arms 14 generally are equipped with a spring structure which is also secured to the frame 15 to yieldingly hold the arms 14 and press roll 10 in the position shown by the solid lines in Fig. 2. Similarly, the presence of these springs is not necessary to illustrate the principle of our invention.

A lower drive roll 22 having a diameter greater than that of press roll 10 is rigidly secured to shaft 24 which in turn is connected to frame 15 and a source of rotational power. A belt 26 embraces the lower drive roll 22 and assists in the eventual formation of a bale from the cut material. As shown in Fig. 2, the press roll 10 and lower drive roll 22 are normally separated only by the thickness of belt 26. As viewed in Fig. 2, press roll 10 normally rotates in a counterclockwise direction and the lower drive roll 22 rotates in a clockwise direction.

The arrow in Fig. 2 shows the direction of travel of the cut hay or straw as it starts into the machine to commence the bale-forming cycle. The numeral 28 designates a twine tube which is pivotally secured to the frame 15 (details not shown) and which is adapted to move into the position of Fig. 2 at predetermined intervals. The loose end of a length of twine 29 is shown extending from twine tube 28 and the twine 29 is the free end of a supply of twine which can be moved through tube 28. A twine cutting mechanism (not shown) is also connected to frame 15 and is coordinated with twine tube 28 to cut the twine 29 at desired intervals. The structure described thus far comprises the elements of a roll-type baler which are generally connected with the operation of our invention.

Our device is comprised of a substantially vertical bracket 30 which is rectangular in shape and which has a substantially horizontal flange 32 on its top edge. A bend line is located at 34 so that the lower portion 36 of bracket 30 is bent forwardly to a slight degree with respect to the vertical bracket. The rear face of bent portion 36 is covered with a band 38 which can be secured to portion 36 by rivets 40. Band 38 should be of a very dense material which does not succumb to being worn away by friction. We have found that brake lining material serves very well for the intended purpose of band 38.

An arm 42 can extend laterally and forwardly from one end of flange 32, as shown in Fig. 3. A circular split sleeve 44 having pierced ear portions 46 on its two ends can be adjustably secured to the forward end of arm 42 by nut and bolt assembly 48. The longitudinal axis of split sleeve 44 is substantially parallel to bracket 30. Holes 50 can appear in the flange 32 of bracket 30 to facilitate the securing of the bracket to frame angle 17 by nut and bolt assemblies 52. As shown in Fig. 2, the bracket 30 is of such size that it spans the distance between angle member 17 and press roll 10 so that the band 38 on the bracket 30 can engage the press roll at a point slightly above center when the press roll is in its lowermost position. Bracket 30 should be mounted on angle 17 at a point directly in front of the position of twine tube 28, as viewed in Fig. 2.

As the hay or other cut material moves in the direction of the arrow in Fig. 2 and passes over belt 26 and between the press roll 10 and lower drive roll 22 (both of which are rotating as described above), the press roll 10 is rotated upwardly a slight degree to permit passage of the hay through the rolls. The normal operating position of roll 10 can be at any point between the positions shown by the dotted and solid lines in Fig. 2. After a given quantity of hay has passed through the press roll 10 and lower drive roll 22, the twine tube 28 pivots downwardly on frame 15 and "dangles" the free end of twine 29 before the rotating rolls 10 and 22. The free end of the twine is then carried into the rolls by the last bit of hay and the normal and desired path of the twine is the same path defined by belt 26. However, sometimes the twine 29 adheres to the press roll 10 and departs from belt 26 to move upwardly with the axial rotation of the press roll. Since the band 38 is in engagement with press roll 10 at a point on the roll in alignment with the point at which the twine entered the machine, the band 38 will intercept the twine as it starts to wind about roll 10 and will shear the twine therefrom. The free end of the twine will then be carried along its intended path by the last bit of hay on the belt 26.

As clearly shown in Fig. 2, the band 38 is in engagement with press roll 10 even when the roll 10 is in the elevated position shown by dotted lines. This result is attained by the fact that the portion 36 of bracket 30 is bent forwardly to somewhat align itself with the path defined by the perimeter of roll 10 as the roll pivots upwardly on arms 14. Not only does bent portion 36 permit the bracket 30 to keep in contact with roller 10 as the roller pivots on arms 14, but it prevents any unusual binding effect from taking place between the roll and band 38. This same result could be attained by mounting bracket 30 on roll 10 in some way so that if the roll pivoted, the bracket would move also. However, this arrangement of structure would entail much costly mounting equipment where our device simplifies the mounting of the bracket 30 by utilizing the conventional frame angle member 17.

The twine tube 28 always deposits the free end of twine 29 at the end of roll 10. Arm 42 on bracket 30 is designed to support split sleeve 44 which is mounted over the sleeve 18 on gear box 20 and the portion of shaft 16 that extends into gear box 20. The function of split sleeve 44 is to prevent any "backlash" action of twine 29 from ever becoming entangled with the shaft 16 at the point where it enters the gear box 20. As stated above, most of the length of shaft 16 is encompassed in a roll member which is not shown on the drawings.

In view of the above remarks, it is seen that our invention accomplishes at least its stated objectives and it has permitted a very complex machine to operate much more successfully.

Some changes may be made in the construction and arrangement of our press roll twine guard for roll-type balers without departing from the real spirit and purpose of our invention, and it is our intention to cover by our claims, any modified forms of structure or use of mechanical equivalents which may be reasonably included within their scope.

We claim:
1. In combination with a roll-type baling machine having a frame and a first roll member mounted on said frame, a pair of arms operatively pivotally secured to a common pivotal axis on said frame, a second roll member mounted between said arms, said rollers being adapted to receive a binding twine therebetween, said first and second roll members being parallel to each other and in operative engagement with each other, and a bracket fixedly secured to said frame and having a surface in engagement with said second roll member to prevent the twine from being wound around said second roll member; the distance from the pivotal axis of said arms on said frame to said surface and the nearest point on the periphery of said second second roll being substantially the same so that said surface can maintain its position of engagement with said second roll while said second roll is pivoting with said arms without substantially increasing the pressure of engagement between said surface and said second roll.

2. In combination with a roll-type baling machine having a frame and a first roll member mounted on said frame, a pair of arms operatively pivotally secured to a common pivotal axis on said frame, a second roll member mounted between said arms, said rollers being adapted to receive a binding twine therebetween said first and second roll members being parallel to each other and in operative engagement with each other, and a bracket fixedly secured to said frame and having a surface in engagement with said second roll member to prevent the twine from being wound around said second roll member, said surface on said bracket dwelling in a plane substantially parallel to the path defined by the pivotal movement of the center of said second roll so that said surface can maintain its position of engagement with said second roll while said second roll is pivoting with said arms without substantially increasing the pressure of engagement between said surface and said second roll.

References Cited in the file of this patent
UNITED STATES PATENTS

| | | |
|---|---|---|
| 1,943,080 | Langston | Jan. 9, 1934 |
| 2,445,831 | Hoffman et al. | July 27, 1948 |
| 2,828,123 | Guillemette | Mar. 25, 1958 |